United States Patent [19]

Devereaux et al.

[11] Patent Number: 4,751,789
[45] Date of Patent: Jun. 21, 1988

[54] SWIVEL JIG FISHING LURE

[75] Inventors: Chuck Devereaux, Stratford; Joe D. Craig, Moore, both of Okla.

[73] Assignee: Hart Tackle Company, Inc., Stratford, Okla.

[21] Appl. No.: 931,200

[22] Filed: Nov. 17, 1986

[51] Int. Cl.$^4$ .............................................. A01K 85/00
[52] U.S. Cl. .................. 43/42.39; 43/42.44; 43/42.28
[58] Field of Search .................. 43/42.39, 42.28, 42.44

[56] References Cited

U.S. PATENT DOCUMENTS

| | | | |
|---|---|---|---|
| 2,877,592 | 3/1959 | Basgall | 43/42.44 |
| 2,955,378 | 10/1960 | Burke | 43/42.39 X |
| 3,006,103 | 10/1961 | Scott | 43/42.44 X |
| 3,497,987 | 3/1970 | Perrin | 43/42.39 X |
| 3,803,747 | 4/1974 | Cartwright | 43/42.44 X |
| 3,909,974 | 10/1975 | Kent | 43/42.39 X |
| 3,965,606 | 6/1976 | Bingler | 43/42.39 X |
| 3,990,171 | 11/1976 | Davis | 43/42.44 X |
| 4,045,903 | 9/1977 | Parker | 43/42.39 X |

Primary Examiner—Nicholas P. Godici
Assistant Examiner—Carmine Cuda
Attorney, Agent, or Firm—Laney, Dougherty, Hessin & Beavers

[57] ABSTRACT

A fishing lure which includes a heavy lure body having a protuberant belly portion and a constricted neck portion joining the belly portion to a slightly enlarged end. At the opposite end of the body from the slightly enlarged end is a retrieving line eye which is set into the opposite side of the body from the belly portion. A buck tail or skirt is secured to the body by a tie ring extending around the strands of the buck tail at the location of the constricted neck portion. An elongated worm impaling hook, having a barb at one end and an eye at the other, is connected to the body at the enlarged end. A flexible, resilient artificial worm is impaled on the hook.

2 Claims, 1 Drawing Sheet

SWIVEL JIG FISHING LURE

FIELD OF THE INVENTION

This invention relates to fishing jigs, and more particularly, to a swivel jig having a relatively heavy or weighted body portion to one end of which a hook is swivelly connected, and to the other end of which a retrieval line eye is connected. A skirt or buck tail is banded around an intermediate part of the body portion.

BACKGROUND OF THE INVENTION

Brief Description of the Prior Art

Many types of fishing jigs have been heretofore proposed, and a number of these have a relatively heavy or dense body portion which acts as a stabilizing weight, and also acts as an anchor point for the eye to which the retrieving line is secured. A second eye secured to the body portion functions as a swivel situs to which a hook is swivelly connected. Some jigs of this type also have buck tails or skirts attached to the lure body for the purpose of disguising the hook and/or attracting fish to the lure.

Upperman U.S. Pat. No. 3,315,304 depicts and describes a fishing lure which has a buck tail secured by strands of wire filament to the after portion of a hard rigid body. The buck tail functions to partially disguise a conventional or standard fishing hook which is rigidly attached to the body and cannot swivel. One end of the fishing hook forms an eye by which a retrieving line can be attached to the lure. This lure does not resemble the present invention in its design or function, except in the broadest terms.

In Cressey U.S. Pat. No. 1,612,264, the trolling spoon there shown includes a skirt forming a screen of fronds or feathers which partially disguise a hook. The feathers or fronds are secured by a ring around the after portion of the lure body.

In De Zeeuw U.S. Pat. No. 3,037,316, the fishing jig there shown includes a body having a swedged and downwardly protuberant belly, and has a retrieving line eye secured to the upper forward end of the body upon which the belly is formed. The rear or after part of the lure body has an elongated worm secured around the body by means of a wrap of wire or filament, and this worm is impaled upon a hook 24 and extends rearwardly from the hook.

Duncan U.S. Pat. No. 4,414,772, depicts and describes a top water fishing lure which has a rigid body having an elongated, relatively small diameter tail portion, and a protuberant belly portion closer to the forward end of the lure body. An eye for the attachment of a retrieving line to the lure is secured to the upper forward portion of the body. A flexible, resilient elongated tail, which is twisted so that it will undergo a whipping motion during retrieve, is secured around the rear portion of the lure body, and functions to partially disguise a hook which is rigidly secured to the rear of the rigid lure body. Instead of the elongated worm element, a plastic skirt made up of a plurality of fronds or filaments can be utilized for securing the forward end of the skirt or its waist portion around the lure body near the rear end thereof.

Arbogast U.S. Pat. No. 2,111,020, discloses an artificial fishing bait which includes a buck tail or skirt secured to a protuberant portion at the rear end of a hard body part of the lure. The body includes a protuberant belly which projects downwardly, and which has secured, to one side thereof, an eye by which a retrieving line can be swivelly connected to the forward end of the lure body. A hook projects into the rear end of the body portion and is disguised by being located within the fronds of the skirt.

A fishing lure having a body shape slightly resembling the body of the lure of the present invention is the lure shown in Berry U.S. Pat. No. 2,510,769. The body portion of the Berry fishing lure is cut away so that it has a forwardly facing surface which projects at an acute angle to the longitudinal axis of the lure.

BRIEF DESCRIPTION OF THE PRESENT INVENTION

The present invention provides an improved fishing lure, which lure is especially effective as a fish attractant, and is relatively sure in its capability of hooking fish which strike the lure.

Broadly described, the lure of the invention includes a heavy lure body which has a protuberant belly portion and a constricted neck portion by which this belly portion is joined to a slightly enlarged end at a rear end of the lure body. At a forward end of the lure body from that slightly enlarged end is a retrieving line eye which is set into the body on the opposite side of the body from the belly portion. At that same end of the lure body opposite the end near which the constricted neck portion is located, the lure body has a flat cam surface which extends at an angle to the longitudinal axis of the lure. A buck tail is secured to the lure body at the location of the constricted neck portion by extending a retaining ring or filament around strands of the buck tail to hold the strands tightly against the constricted neck portion.

An angulated hook is swivelly connected to the enlarged end of the heavy lure body and functions to impale an elongated segmented artificial worm.

The flat cam surface which is provided extends at an acute angle to the longitudinal axis of the lure body and, in general, to the axis of the swivel eye which is secured to the enlarged end of the lure body for purposes of swivelly supporting the angulated hook. This configuration of the lure, and particularly the way the lure body is shaped, enables the lure to be rested during retrieve, in which rest position the body portion will nose down against the bottom of the body of water which is being fished. The body portion of the lure will come to rest, nosedown, on the bottom of the lake or other water body, and the cam surface and protuberant belly portion to one side thereof function cooperatively so that any tendency of the lure to tip to one side or the other will continually re-orient the barb portion of the hook to a position such that it will impale a fish striking the lure.

An important object of the invention is to provide a fishing lure which is quite effective for catching fish, which is aesthetic in appearance, and which is ruggedly constructed.

A further object of the invention is to provide a fishing lure of the swivel jig type which can be rested during retrieve, and when struck by a fish when in the at rest position of the lure on the bottom of the body of water which is being fished, the lure will tend to re-orient itself in a direction such that the striking fish will be impaled upon the barb of the hook forming a part of the lure.

GENERAL DESCRIPTION OF THE DRAWINGS

DETAILED DESCRIPTION OF THE PREFERRED EMBODIMENT OF THE INVENTION

Figure 1:
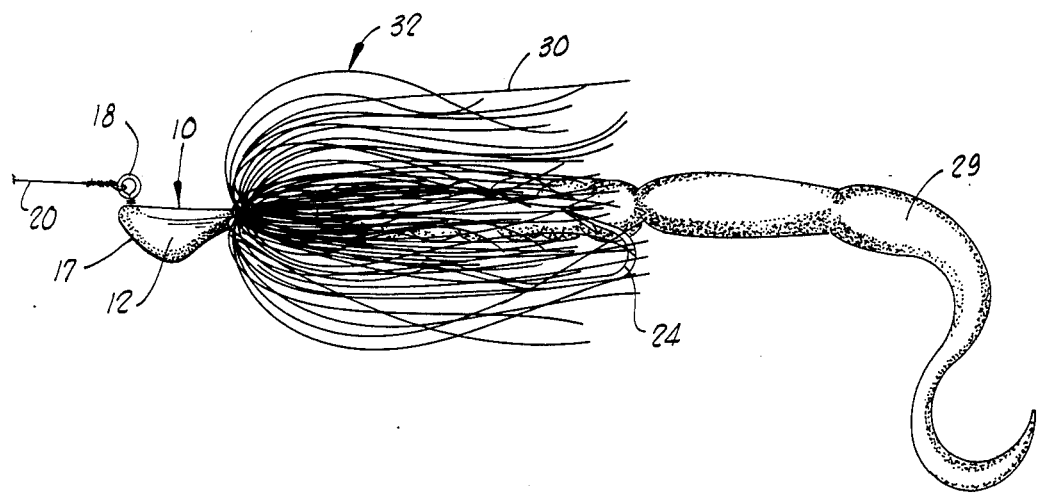
FIG. 1 is a side elevation view of the fishing lure of the invention.
Figure 2:
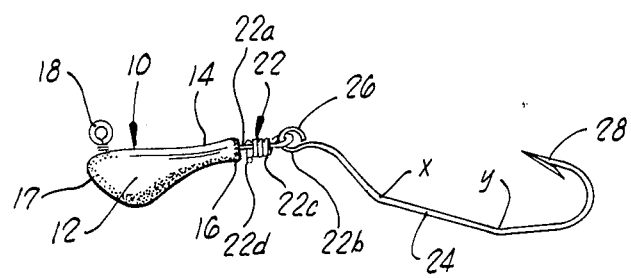
FIG. 2 is a side elevation view of a part of the fishing lure of the invention, showing the buck tail and the artificial worm portion of the fishing lure removed.

The fishing lure of the invention, as depicted in the drawings, includes a hard lure body, designated generally by reference numeral 10. The lure body 10 can be made of lead or other relatively dense, rigid material, and includes a protuberant belly portion 12 which protrudes from one side of the body. The body 10 further includes a restricted neck portion 14 which joins the belly portion 12 to an enlarged rear end 16. At the end of the body opposite the end to which the hook is connected, the body has a flat cam surface 17 formed thereon. The cam surface 17 lies in a plane which extends at an acute angle to the longitudinal axis of the lure body.

The upper side of the lure body 10 has an eye 18 set into the forward upper end of the lure body for purposes of attaching a retrieving line 20 thereto. At its opposite end, the lure body 10 has secured thereto a swivel eye 22 which projects generally in line with the longitudinal axis of the lure body, and which functions as a point for swivelly connecting to the lure body, an angulated fishing hook 24. Swivel eye 22 includes an elongated swivel shank portion 22a having an end secured in the rear end of said lure body and extending away from said rear end of the lure body. The swivel shank eye 22 carries at the other end of the swivel shank portion 22a, a loop 22b which lies in substantially the same plane as the front to rear longitudinal axis of the lure body. A plurality of annular wraps 22c of wire extend around the shank portion between the ends thereof and these wraps terminate in a free end 22d. The hook 24 carries, at one of its ends, a loop 26 which engages the loop 22b, and at its other end, a barb 28. Between the loop 26 and the barb 28, the hook defines a pair of shaped angulations "X" and "Y", each of which are obtuse angles of between 140° and 170°. An artificial segmented worm 29 (a "riffle tail worm") is impaled on the hook 24 in the manner shown so as to hide the barb 28.

Figure 3:
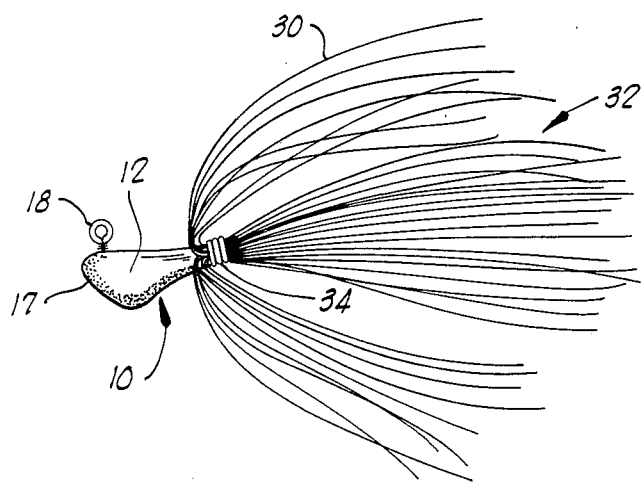
FIG. 3 is a side elevation view showing the hook and artificial worm parts of the fishing lure removed, and showing the manner in which the buck tail or skirt is attached to the heavy lure body.

The constricted neck portion 14 of the lure body 10 functions as a situs for securing to and around the lure body, a plurality of synthetic resin or rubber fronds or strands 30 which collectively make up a buck tail or skirt, denominated generally by reference numeral 32. The fronds or strands 30 are held in position at the neck portion 14 of the body 10 by means of a wire or filament 34 which is wrapped around the neck portion and around intermediate portions of the strands or fronds 30 at this location, as best shown in FIG. 3.

OPERATION

The fishing lure of the invention is a highly effective swivel jig. The swivel jig fishing lure can be cast to a location where it is desired to fish, and then, upon retrieve, the lure presents an alluring object to game fish. The live action from the worm-like segmented tail 29 as it whips about in the water upon retrieve is attractive to fish, as are the waving fronds or strands of the buck tail 32.

In one way of utilizing the swivel jig, it may be permitted to sink to the bottom of the body of water which is being fished. When this occurs, the attitude of the lure is such that the heavy body 10 touches the bottom, and the riffle tail worm 29 floats upwardly. It should be pointed out that in place of the worm 29, artificial lizards, crayfish or grubs can also be used. With the swivel jig in an upright position with the body resting on the bottom, the lure has a very life-like appearance. Further, this attitude permits the swivel jig lure to be more easily struck, and taken by a game fish at any point during the retrieve.

The manner in which the hook is swivelly connected to the body 10, coupled with the slanted or inclined cam surface 17 on the body which causes the body to tend to gravitate toward one side, generates a cam action which turns the point of the hook in the direction from which the fish is apt to be striking in any instance. During this tilting action, the fronds or strands 30 of the buck tail 32 undergo a life-like waving motion in the water, which motion is also attractive to fish.

The swivel jig fishing lure of the invention is substantially completely weedless, and thus can be fished in very thick cover without becoming impaled or fouled. Moreover, the lure is highly effective, and can be easily retrieved with intermittent rest points at which the lure rests in an attitude such that the riffle tail worm extends upwardly, and the specially shaped body rests on the bottom and imparts a cam action to the lure, causing the point of the hook to be turned toward a striking fish in almost every instance.

Although a preferred embodiment of the lure has been herein described and illustrated in the drawings, it will be understood that various changes and innovations can be effected in the lure without departure from the basic principles of the invention. Changes and innovations of this type are deemed to be circumscribed by the spirit and scope of the invention, except as the same may be necessarily limited by the appended claims, or reasonable equivalents thereof.

What is claimed is:

1. A fishing lure comprising:
    a body having a forward end, a rear end, a protuberant belly portion and further having a constricted neck portion, said body being a solid member, and said rear end being slightly larger than said neck portion;
    a retrieval eye on the opposite side of the body from said belly portion for attaching a retrieving line to the lure body;
    a skirt having a portion secured around said constricted neck portion and projecting rearwardly from said body;
    a swivel eye secured to said rear end of said lure body and projecting rearwardly from said body, said swivel eye including:

a swivel shank portion having an end secured to the rear end of said lure body and extending away from said body rear end;

a loop carried on the other end of the shank portion and lying in substantially the same plane as the front-to-rear longitudinal axis of said body; and a plurality of annular wraps of wire around said swivel shank portion between the ends of said swivel shank portion, and terminating in an exposed free end;

a hook pivotally connected to said swivel loop and spaced from the rear end of said lure body and extending rearwardly within said skirt to a position in which at least a part of the hook is disguised from fish, said hook including a pair of spaced obtuse angles each of between 140° and 170° formed therein between the ends of said hook, the hook including:

a hook eye at one end of the hook pivotally engaged with said swivel loop;

a barb at the other end of the hook; and a hook shank interconnecting the hook eye and the barb, and having bends there along defining said obtuse angles;

a resilient, flexible, elongated, buoyant artificial bait element resembling a naturally occurring bait species having one end portion threaded over said hook along a portion of the shank thereof and at the location of the eye of said hook, and having the barb of said hook passed into, and embedded in a concealed manner in, said artificial bait element at a location spaced along said hook from said hook eye in the direction of said hook barb and bridging across said angles in said hook shank with a straight portion of said bait element extending along a straight line between the point where said bait element is threaded on the shank portion of said hook adjacent said hook eye, and the point where the barb of said hook is embedded in said bait element, whereby said artificial bait element protects the point of said hook and prevents the entanglement of the hook in weeds, and said connection of said hook eye to said swivel loop of said swivel eye permits said hook and the buoyant bait element to undergo a side-to-side and up-and-down motion while restricting said bait element and hook against rotation about the axis of said swivel shank.

2. A fishing lure as defined in claim 1 wherein said body has a flat cam surface near the forward end thereof and lying in a plane extending at an acute angle to the longitudinal axis of the lure body.

* * * * *